United States Patent [19]

Yagishita

[11] Patent Number: 5,334,666
[45] Date of Patent: Aug. 2, 1994

[54] VULCANIZABLE ELASTOMER COMPOSITION COMPRISING EPOXY GROUP-CONTAINING ELASTOMER, ORGANIC COMPOUND HAVING AT LEAST TWO -C(X)-NH-C(Y)-BONDS (X=O OR S, Y=O OR S), QUATERNARY AMMONIUM OR PHOSPHONIUM SALT, AND OPTIONALLY A UREA OR THIOUREA COMPOUND

[75] Inventor: Shigelu Yagishita, Yokohama, Japan

[73] Assignee: Nippon Zeon Co., Ltd., Tokyo, Japan

[21] Appl. No.: 51,291

[22] Filed: Apr. 23, 1993

Related U.S. Application Data

[63] Continuation of Ser. No. 300,726, Jan. 25, 1989, abandoned, which is a continuation of Ser. No. 89,177, Aug. 25, 1987, abandoned.

[30] Foreign Application Priority Data

Aug. 29, 1986 [JP] Japan ................... 61-202817
Aug. 29, 1986 [JP] Japan ................... 61-202818

[51] Int. Cl.$^5$ ................... C08F 220/32
[52] U.S. Cl. ................... 525/327.3; 525/340; 525/352; 525/374; 525/375
[58] Field of Search .......... 525/327.3, 346, 347, 525/340, 374, 375, 352

[56] References Cited

U.S. PATENT DOCUMENTS

| | | | |
|---|---|---|---|
| 2,013,117 | 9/1935 | Tuley | 525/346 |
| 2,480,814 | 8/1949 | Punshon, Jr. | 525/346 |
| 3,294,749 | 12/1966 | Pratt | 528/93 |
| 3,554,968 | 1/1971 | Habermeier et al. | |
| 3,597,410 | 8/1971 | Lieske | 528/118 |
| 3,640,910 | 2/1972 | Ferret et al. | |
| 3,779,949 | 12/1973 | Porret et al. | |
| 3,838,101 | 9/1974 | Steele et al. | |
| 4,144,159 | 3/1979 | Bosso et al. | |
| 4,577,099 | 3/1986 | Robinson et al. | |
| 4,650,834 | 3/1987 | Yagishita | 525/386 |
| 4,931,509 | 6/1990 | Yagishita | 525/208 |

FOREIGN PATENT DOCUMENTS 145745 11/1980 Japan .
177018 9/1985 Japan .

*Primary Examiner*—Christopher Henderson
*Attorney, Agent, or Firm*—Sherman and Shalloway

[57] ABSTRACT

A vulcanizable elastomer composition comprising an epoxy group-containing elastomer, and blended therewith (1) an organic compound having at least two bonds of the formula —C(X)'NH—C(Y)—, wherein X and Y are both oxygen or sulfur, or one of X and Y is oxygen and the other is sulfur, in the molecule, (2) a quaternary compound selected from quaternary ammonium salts and quaternary phosphonium salts, and optionally, (3) a compound having one >N—C(-Z)—N< bond wherein Z represents an oxygen or sulfur.

7 Claims, 1 Drawing Sheet

VULCANIZABLE ELASTOMER COMPOSITION COMPRISING EPOXY GROUP-CONTAINING ELASTOMER, ORGANIC COMPOUND HAVING AT LEAST TWO -C(X)-NH-C(Y)-BONDS (X=O OR S, Y=O OR S), QUATERNARY AMMONIUM OR PHOSPHONIUM SALT, AND OPTIONALLY A UREA OR THIOUREA COMPOUND

CROSS-REFERENCE TO RELATED APPLICATIONS

This application is a continuation of application Ser. No. 07/300,726, filed Jan. 25, 1989, now abandoned; which is a continuation of application Ser. No. 07/089,177, filed Aug. 25, 1987, now abandoned.

BACKGROUND OF THE INVENTION

1. Field of the Invention

This invention relates to a vulcanizable epoxy group-containing elastomer composition. More specifically, it relates to a curable epoxy group-containing elastomer composition having superior processing stability (scorch stability) and storage stability, rapid vulcanizability, excellent compression set and excellent heat aging resistance.

2. Description of the Prior Art

Polyamines, diamine carbamates, ammonium salts of organic carboxylic acids, dithiocarbamate salts, and imidazoles are generally in widespread use as vulcanization systems for epoxy group-containing elastomers having epoxy groups as crosslinking sites. With polyamines or diamine carbamates, however, premature cure is difficult to inhibit, and the vulcanizable composition has poor storage stability. When ammonium salts of organic carboxylic acids, dithiocarbamate salts or imidazoles are used, the resulting vulcanizable compositions have good processing stability and storage stability, but require post-vulcanization for relatively long periods of time since the rate of vulcanization is slow.

SUMMARY OF THE INVENTION

In order to solve these problems, the present inventors extensively worked on vulcanization systems for elastomers having epoxy groups as crosslinking sites. This work led to the discovery of a vulcanization system composed of a polycarboxylic acid and a quaternary ammonium salt and/or a quaternary phosphonium salt (U.S. Pat. 4,650,834). The present inventors furthered their work on various vulcanization systems in order to improve the performance of this vulcanization system. Consequently, the present inventors have found that when a vulcanization system composed of a low-molecular-weight organic compound having specific bonds in the molecule and a quaternary ammonium salt and/or a quaternary phosphonium salt is used, there can be obtained better processing stability (scorch stability) and storage stability than in the case of using the previously discovered vulcanization system, and excellent rapid vulcanizability, compression set and heat aging resistance.

Thus, according to this invention there is provided a vulcanizable elastomer composition comprising an epoxy group-containing elastomer, and blended therewith (1) an organic compound having at least two bonds of the following formula

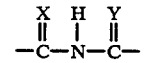

wherein X and Y are both oxygen or sulfur atoms, or one of X and Y is an oxygen atom and the other is a sulfur atom, in the molecule, and (2) a quaternary compound selected from quaternary ammonium salts and quaternary phosphonium salts.

BRIEF DESCRIPTION OF THE DRAWING FIGURES

DESCRIPTION OF THE PREFERRED EMBODIMENT(S)

Figure 1:
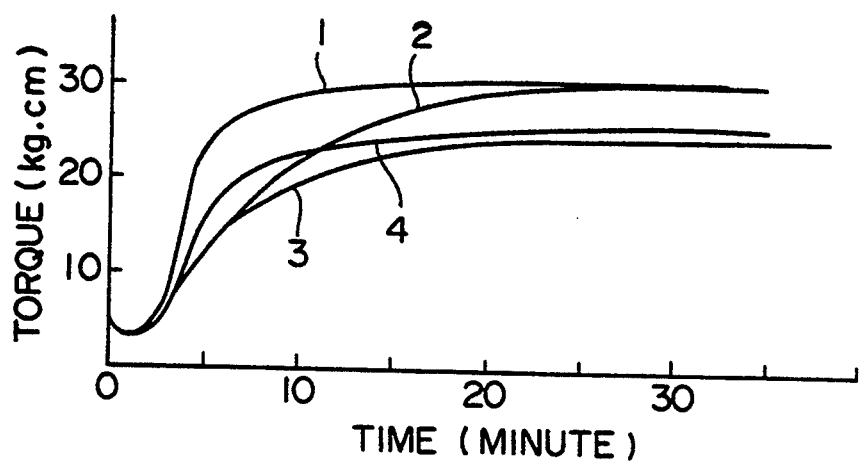
FIG. 1 illustrates the cure curves (torque (kg.cm) vs. time (minutes)), measured by an oscillating disc rheometer, for the compositions of Runs 1–4 of Example 1.

The epoxy group-containing elastomer used in this invention is an elastomer which can be obtained by (1) epoxidizing an elastomer, or (2) copolymerizing 0.1 to 10% by weight, preferably 0.5 to 3% by weight, of a monomer containing an epoxy group as a crosslinking site and 90 to 99.9% by weight, preferably 97 to 99.5% by weight, of at least one monomer having a polymerizable terminal vinyl or vinylidene group by a known polymerization method such as emulsion polymerization, suspension polymerization, solution polymerization or bulk polymerization.

Examples of the epoxy group-containing monomer used as a crosslinking site are glycidyl acrylate, glycidyl methacrylate, vinyl glycidyl ether, allyl glycidyl ether and methacryyl glycidyl ether. Glycidyl acrylate and glycidyl methacrylate are pererred.

Examples of the monomer having a terminal vinyl or vinylidene group copolymerizable with the epoxy group-containing monomer include acrylates and corresponding methacrylates such as methyl acrylate, ethyl acrylate, propyl acrylate, n-butyl acrylate, n-octyl acrylate, methoxymethyl acrylate, methoxyethyl acrylate and ethoxy-ethyl acrylate; vinyl esters such as vinyl acetate, vinyl propionate and vinyl butyrate; vinyl ketones such as methyl vinyl ketone and ethyl vinyl ketone; vinyl aromatic compounds such as styrene, alpha-methylstyrene and vinyltoluene; conjugated dienes such as butadiene and isoprene; alpha-monolefins such as ethylene, propyiene and 1-butone; vinyl monomers having a hydroxyl group such as beta-hydroxyethyl acrylate and 4-hydroxybutyl acrylate; and vinyl and vinylidene monomers containing a nitrile group such as acrylonitrile, methacrylonitrile and betacyanoethyl acrylate. These monomers may be used singly or in combination with each other.

Specific examples of the elastomer containing an epoxy group include epoxy group-containing acrylate copolymer elastomers, epoxy group-containing ethylene/vinyl acetate copolymer elastomer, epoxy group-containing ethylene/acrylate copolymer elastomers, epoxy group-containing ethylene/vinyl acetate/acrylate copolymer elastomer, epoxy group-containing ethylene/propylene copolymer elastomer, epoxy group-containing acrylate/ acrylonitrile copolymer elastomers, epoxy group-containing butadiene/acrylonitrile copolymer elastomer, epoxy group-containing butadiene/styrene copolymer elastomer, epoxy group-containing butadiene/acrylonitrile/acrylate copolymer elastomers.

The organic compound having at least two bonds of the formula

wherein X and Y are as defined hereinabove, in the molecule which is used as a vulcanizer in this invention is a heterocyclic, aromatic or aliphatic compound having the aforesaid bonds. The possession of at least two such bonds means not only the presence of at least two such bonds independently from each other, but also the presence of at least two such bonds as a unit as in the case of

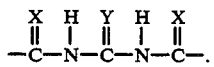

The above bonds may also exist outside the ring as substituents on the heterocyclic compound.

Examples of the heterocyclic compound include parabanic acid, alloxan, alloxantin, alloxan-5-oxime, barbituric acid, 5-hydroxybarbituric acid, 5-benzalbarbituric acid, 5-aminobarbituric acid, 5-hydroxyiminobarbituric acid, 5,5-diethylbarbituric acid, 5-ethyl-5-phenylbarbituric acid, 5-(1-methylbutyl)-5-(allyl)barbituric acid, 5,5-diallylbarbituric acid, isocyanuric acid and pseudouric acid, and compounds resulting from replacing the oxygen atom of

of the above heterocyclic compounds by a sulfur atom, such as 2,4-dithiobarbituric acid and 2-thiobarbituric acid.

Examples of the aromatic compound are pyromellitic diimide, mellitic triimide and 1,4,5,8-naphthaldiimide, and the corresponding thioimides.

Examples of the aliphatic compound are triuret, 1-methyltriuret, 1,1-diethyltriuret and tetrauret and the corresponding thiourets.

The organic compound (1) may be added during or after the polymerization reaction for forming the epoxy group-containing elastomer. Alternatively, it may be added to the elastomer together with other compounding chemicals such as a reinforcing agent by a kneader of the type normally used in the rubber industry.

The amount of the organic compound (1) used is usually 0.1 to 10 parts by weight per 100 parts by weight of the elastomer, and the optimal amount is selected from the above range from the standpoint of the rate of vulcanization, the mechanical properties and compression set of the vulcanizate. If it is lees than 0.1 part by weight, the resulting vulcanizate has a low crosslinking density and cannot be practical. If, on the other hand, it exceeds 10 parts by weight, the rate of vulcanization of the elastomeric composition is markedly low, and no vulcanizate is obtained which is practical. The preferred amount of the organic compound (1) is 0.2 to 5 parts by weight. The quaternary ammonium salt and the quaternary phosphonium salt used in this invention are compounds represented by the general formulae

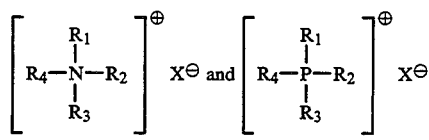

wherein each of $R_1$, $R_2$, $R_3$ and $R_4$ represents a hydrocarbon group having about 1 to 25 carbon atoms, such as an alkyl, aryl, alkylaryl or polyoxyalkylene group, provided that two or three of these groups $R_1$ to $R_4$ may form a heterocyclic structure together with the nitrogen or phosphorus atom; and X represents an anion derived from an inorganic or organic acid in which acidic hydrogen is bonded to halogen or oxygen.

Examples of preferred anions are Cl, Br, I, $HSO_4$, $H_2PO_4$, $P_5COO$, $R_5OSO_3$, $R_5SO$ and $R_5OPO_3H$ ($R_5$ is the same hydrocarbon group as $R_1$ to $R_4$).

Specific examples of the quaternary ammonium salt include tetraethyl ammonium bromide, tetrabutyl ammonium chloride, tetrabutyl ammonium bromide, tetrabutyl ammonium iodide, n-dodecyltrimethyl ammonium bromide, cetyldimethylbenzyl ammonium chloride, methylcetyldibenzyl ammonium bromide, cetyldimethylethyl ammonium bromide, octadecyltrimethyl ammonium bromide, cetyl pyridium chloride, cetyl pyridium bromide, 1,8-diaza-bicyclo(5,4,0)undecene-7-methyl ammonium methosulfate, 1,8-diaza-bicyclo(5,4,-0)undecene-7-benzyl ammonium chloride, cetyltrimethyl ammonium alkylphenoxypoly(ethyleneoxy)ethyl phosphate, cetyl pyridium iodide, cetyl pyridium sulfate, tetraethyl ammonium acetate, trimethylenzyl ammonium benzoate, trimethylbenzyl ammonium p-toluenesulfonate and trimethylbenzyl ammonium borate.

Examples of the quaternary phosphonium salt include triphenylbenzyl phosphonium chloride, triphenylbenzyl phosphonium bromide, triphenylbenzyl phosphonium iodide, triphenylmethoxymethyl phosphonium chloride, triethylbenzyl phosphonium chloride, tricyclohexylbenzyl phosphonium chloride, trioctylmethyl phosphonium dimethylphosphate, tetrabutyl phosphonium bromide, and trioctylmethyl phosphonium acetate.

The quaternary ammonium salts or the quaternary phosphonium salts may be used singly or in combination. They may be used usually in an amount of 0.1 to 10 parts by weight per 100 parts by weight of the epoxy group-containing elastomer. The optimal amount of the quaternary ammonium salt or the quaternary phosphonium salt may be selected from the above range from the standpoint of the rate of vulcanization, processing stability, storage stability, and the mechanical properties and compression set of the vulcanizate. If it is less than 0.1 part by weight, vulcanization hardly proceeds. On the other hand, if it exceeds 10 parts by weight, the rate of vulcanization becomes too fast, and the processing stability and storage stability are impaired. The preferred amount of the quaternary ammonium or phosphonium salt is 0.1 to 5 parts by weight.

In addition to the organic compound (1) and the quaternary compound (2), the vulcanization system used in this invention may, as required, contain a compound (3) having one

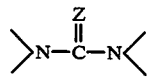

bond (wherein Z represents an oxygen or sulfur atom) in the molecule. The elastomer composition of this invention having such a vulcanization system incorporated therein has further improved processing stability and storage stability.

Examples of the compound (3) include aliphatic ureas such as urea, N-methylurea, N-ethylurea, N,N-dimethylurea, N,N-diethylurea, N,N'-diethylurea, N,N'-ethylideneurea, N-acetylurea, N-acetyl-N'-methylurea, N,N'-dimethylolurea, tetramethylurea, carbamylurea and carbamoylcarbamide acid and the corresponding aliphatic thioureas; aromatic ureas such as phenylurea, benzylurea, N-ethyl-N'-phenylurea, N,N'-diphenylurea, N,N-diphenylurea, N-acetyl-N-phenylurea, N-benzoylurea, tetraphenylurea, N,N-dimethyl-N',N'-dichlorophenylurea, and the corresponding aromatic thioureas; and heterocyclic ureas such as ethyleneurea, glycolylurea, dimethylparabanic acid, benzoylimidazolone and 5-methyluracil and the corresponding heterocylclic thioureas.

These compounds (3) may be used singly or in combination in an amount of usually 0.1 to 10 parts by weight per 100 parts by weight of the epoxy group-containing elastomer. The optimal amount of the compound (3) is selected from the above range from the standpoint of processing stability and the mechanical properties and compression set of the vulcanizate. If it is less than 0.1 part by weight, the effect of adjusting the rate of vulcanization is not sufficient. On the other hand, if it exceeds 10 parts by weight, the rate of vulcanization is extremely slow, and is undesirable in practical applications. The preferred amount of the compound (3) is 0.1 to 5 parts by weight.

The composition of this invention is prepared by mixing the epoxy group-containing elastomer with the vulcanization system composed of the organic compound (1) and the quaternary compound (2) and optionally the compound (3) with a reinforcing agent, a filler, a plasticizer, an antioxidant, a stabilizer, a processing aid, etc. which are normally used in the rubber industry by means of ordinary kneaders. The composition is molded into a shape conforming to the purpose of use, and then vulcanized to form a final product. Vulcanization is carried out usually at a temperature of at least 120° C., preferably about 150° to 220° C., for about 1 to 30 minutes.

The vulcanizable elastomer composition of the invention has excellent processing (scorch) stability and storage stability, and shows excellent performance in respect of rapid vulcanizability, and the mechanical properties, compression set and heat aging resistance of the vulcanizate. Conventional vulcanization systems for the epoxy group-containing elastomer normally require post-vulcanication for relatively long periods of time. Such post-vulcanization may be omitted or drastically shortened in the present invention because the vulcanization system in accordance with this invention can give a vulcanizate having excellent compression set.

Vulcanizates of the epoxy group-containing elastomer obtained by using the vulcanization system in accordance with this invention have superior properties such as heat aging resistance, compression set and water resistance, and can be effectively used as various sealing materials (such as gaskets, O-rings, packings and oil seals), various hoses, belts and rolls by utilizing these desirable properties.

The following examples illustrate the present invention more specifically. In these examples, all percentages and parts are by weight.

Figure 2:
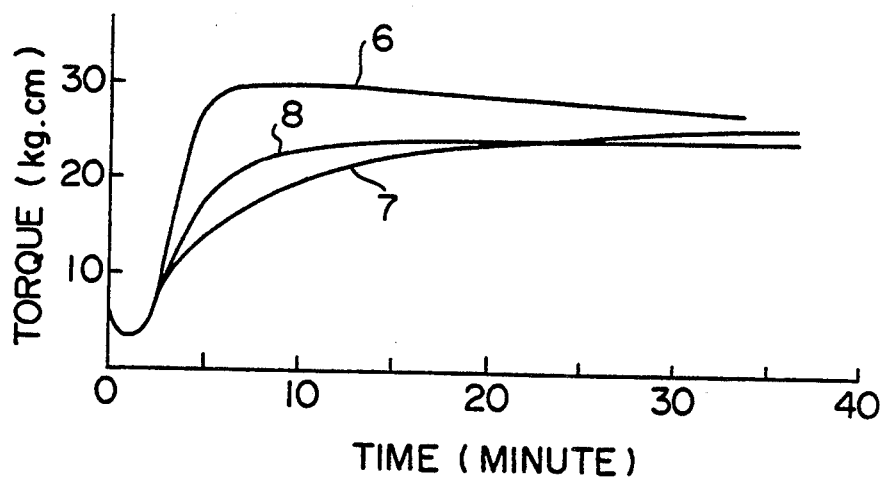
FIG. 2 illustrates the cure curves (torque (kg.cm) vs. time (minutes)), measured by an oscillating disc rheometer, for the compositions of Runs 6, 7 and 8 of Example 1.
Figure 3:
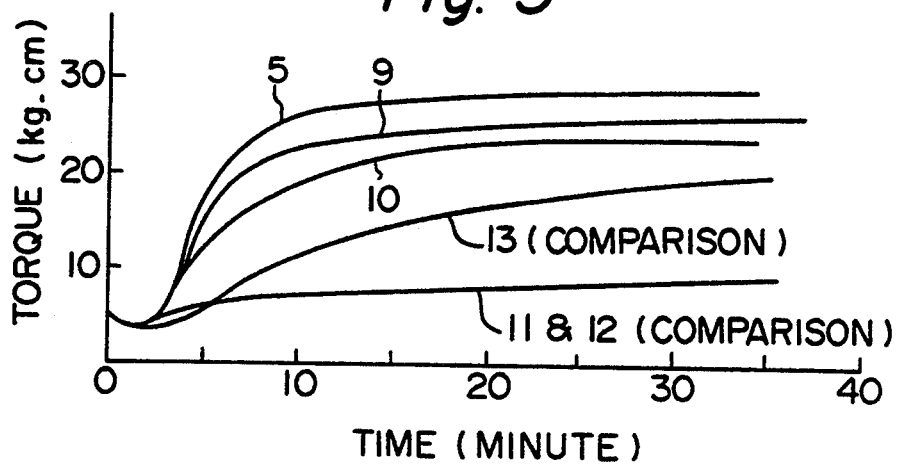
FIG. 3 illustrates the cure curves (torque (kg.cm) vs. time (minutes)), measured by an oscillating disc rheometer, for the compositions of Runs 5 and 9–13 of Example 1.

FIGS. 1 to 3 of the accompanying drawings are cure curves measured in Example 1. The numbers attached to the curves indicate run numbers.

EXAMPLE 1

In each run, 100 parts of epoxy group-containing acrylate copolymer elastomer A (having the composition shown in Table 1) synthesized by an ordinary emulsion polymerization method, 1 part of stearic acid, 60 parts of MAF carbon black (Seast 116, a product of Tokai Carbon Co., Ltd.), 1 part of an amine-type antioxidant (NAUGARD 445, a product of Uniroyal Inc.) and a predetermined amount of each of the various vulcanizers indicated in Table 2 were kneaded by means of a 6-inch roll to prepare a composition.

TABLE 1

| Chemical composition | Acrylate elastomer | |
|---|---|---|
| (% by weight) | A | B |
| Ethyl acrylate | 48.6 | 48.8 |
| Butyl acrylate | 30 | 30 |
| Methoxyethyl acrylate | 20 | 20 |
| Glycidyl methacrylate | 1.4 | 1.2 |
| Mooney viscosity ($ML_{1 + 4'}$ 100° C.) | 37 | 38 |

Note:
The composition was determined from the chemical shifts of $^{13}C$-NMR.

TABLE 2

| | Run No. | Vulcanizer Type | Amount (phr) |
|---|---|---|---|
| Invention | 1 | parabanic acid/OTMeABr | 1.8/1.8 |
| | 2 | isocyanuric acid/OTMeABr | 2/1.8 |
| | 3 | barbituric acid/OTMeABr | 2/1.8 |
| | 4 | alloxan/OTMeABr | 2.5/1.8 |
| | 5 | 5,5-diethylbarbituric acid/OTMeABr | 2.5/1.8 |
| | 6 | thiocyanuric acid/OTMeABr | 2/1.8 |
| | 7 | 2-thiobarbituric acid/OTMeABr | 2/1.8 |
| | 8 | murexide/OTMeABr | 4/1.8 |
| | 9 | pyromellitic diimide/OTMeABr | 3/1.8 |
| | 10 | triuret/OTMeABr | 2.3/1.8 |
| Comparison | 11 | phthalimide/OTMeABr | 1.7/1.8 |
| | 12 | uric acid/OTMeABr | 2.6/1.8 |
| | 13 | ammonium benzoate | 1.3 |

Note:
OTMeABr stands for octadecyltrimethyl ammonium bromide.

The Mooney scorch time of the resulting composition was measured in accordance with JIS K-6300.

The composition was also press-cured at 170° C. for 20 minutes, and then post-cured for 4 hours in a Geer-'oven at 150° C. The properties of the resulting vulcanizate were measured in accordance with JIS K-6301.

To evaluate the storage stability of the composition, its Mooney scorch time was measured after it was left to stand at room temperature for 4 weeks.

The results are summarized in Table 3.

TABLE 3

| Test item | Run No. Invention | | | | | | | | | | Comparison | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Mooney scorch time (ML, 145° C.) | | | | | | | | | | | | | |
| Minimum viscosity | 48.0 | 44.0 | 42.0 | 40.0 | 44.0 | 50.0 | 49.0 | 42.0 | 45.0 | 42.0 | 45.0 | 46.0 | 51.0 |
| t5 (min.) | 3.6 | 3.9 | 5.7 | 4.3 | 4.0 | 3.3 | 5.7 | 4.3 | 3.9 | 3.9 | 3.5 | 3.7 | 3.3 |
| t35 (min.) | 6.8 | 12.5 | 18.8 | 6.4 | 6.5 | 4.9 | 16.0 | 6.5 | 7.1 | 10.5 | above 30 | above 30 | 5.4 |
| Mooney scorch time (ML, 145° C.) after standing at room temperature for 4 weeks | | | | | | | | | | | | | |
| Minimum viscosity | 48.5 | 43.5 | 43.0 | 40.0 | 44.0 | 55.0 | 51.0 | 43.0 | 46.0 | 42.0 | 49.0 | 48.0 | 61.5 |
| t5 (min.) | 3.5 | 3.9 | 5.6 | 4.2 | 4.1 | 3.7 | 5.9 | 4.4 | 4.0 | 3.9 | 3.8 | 4.0 | 3.5 |
| t35 (min.) | 6.5 | 12.8 | 17.5 | 6.1 | 6.7 | 5.2 | 16.5 | 6.7 | 7.5 | 10.8 | above 30 | above 30 | 5.8 |
| Properties after press-curing at 170° C. for 20 minutes | | | | | | | | | | | | | |
| Tensile strength (kg/cm²) | 113 | 115 | 108 | 105 | 114 | 116 | 103 | 109 | 115 | 107 | 62 | 65 | 108 |
| Elongation (%) | 240 | 220 | 260 | 250 | 220 | 210 | 260 | 250 | 220 | 260 | 450 | 370 | 270 |
| 100% Tensile stress (kg/cm²) | 55 | 57 | 40 | 43 | 57 | 61 | 42 | 43 | 55 | 41 | 18 | 19 | 45 |
| Hardness (JIS) | 67 | 69 | 65 | 66 | 69 | 70 | 66 | 67 | 69 | 64 | 62 | 62 | 65 |
| Properties after post-curing at 150° C. for 4 hours | | | | | | | | | | | | | |
| Tensile strength (kg/cm²) | 125 | 129 | 127 | 127 | 127 | 132 | 128 | 128 | 129 | 127 | 123 | 118 | 139 |
| Elongation (%) | 200 | 190 | 210 | 210 | 200 | 190 | 200 | 200 | 200 | 210 | 190 | 240 | 190 |
| 100% Tensile stress (kg/cm²) | 68 | 66 | 59 | 61 | 65 | 74 | 63 | 60 | 62 | 59 | 70 | 48 | 78 |
| Hardness (JIS) | 70 | 71 | 68 | 70 | 70 | 73 | 68 | 70 | 71 | 68 | 71 | 63 | 73 |
| Properties after aging at 175° C. × 70 hours (vulcanizate obtained by press-curing at 170° C. for 20 min.) | | | | | | | | | | | | | |
| Tensile strength (kg/cm²) | 131 | 130 | 128 | 129 | 124 | 140 | 138 | 130 | 135 | 128 | 103 | 109 | 140 |
| Elongation (%) | 140 | 130 | 130 | 130 | 130 | 120 | 120 | 130 | 130 | 130 | 90 | 160 | 120 |
| Hardness (JIS) | 75 | 76 | 75 | 76 | 76 | 79 | 78 | 75 | 78 | 77 | 81 | 70 | 79 |
| Compression set (150° C. × 70 hrs, 25% compression) | | | | | | | | | | | | | |
| Vulcanizate obtained by press-curing at 170° C. × 20 min. | 32 | 33 | 42 | 39 | 37 | 38 | 39 | 38 | 34 | 40 | 92 | 96 | 70 |
| Vulcanizate obtained by post-curing at 150° C. × 4 hrs. | 22 | 19 | 27 | 30 | 20 | 32 | 35 | 25 | 19 | 30 | 55 | 49 | 43 |

The cure curves at 170° C. of the compositions obtained in Example 1, which were measured by an oscillating disc rheometer (made by Toyo Seiki K. K.), are shown in FIGS. 1 to 3.

These results show that the vulcanization systems in accordance with the present invention had better scorch stability than the conventional vulcanization system (Run No. 13) and also possessed rapid vulcanizability. It is also seen that the vulcanization characteristics of comparative compounds (Runs Nos. 11 and 12) having only one

bond in the molecule are poor.

The compositions comprising the vulcanization systems of this invention showed a vulcanization behavior not greatly different from the as-prepared compositions even after they were left to stand at room temperature for 4 weeks, and this indicates excellent storage stability. Furthermore, the vulcanization systems in accordance with this invention show excellent compression set values even after press curing at 170° C. for as short as 20 minutes. This indicates that post-curing can be omitted.

EXAMPLE 2

In each run, 100 parts of the epoxy group-containing acrylate elastomer B (see Table 1), 1 part of stearic acid, 60 parts of MAF carbon black, 1 part of an amine-type antioxidant (NAUGARD 445, a product Uniroyal Inc.) and a predetermined amount of each of the vulcanizers shown in Table 4 were kneaded by means of a 6-inch roll to prepare a composition.

TABLE 4

| Vulcanizer and its amount (phr) | Run No. Invention | | | Comparison | |
|---|---|---|---|---|---|
| | 14 | 15 | 16 | 17 | 18 |
| parabanic acid | 1.5 | — | — | — | — |
| isocyanuric acid | — | 1.7 | — | — | — |
| 5,5-diethyl-barbituric acid | — | — | 2.4 | — | — |
| eicosanedioic acid | — | — | — | 1.4 | — |
| OTMeABr | 1.5 | 1.5 | 1.8 | 1.8 | — |
| ammonium benzoate | — | — | — | — | 13 |

The Mooney scorch time of the resulting composition was measured. The composition was press-cured at 170° C. for 20 minutes, and then post-cured for 4 hours in a Geer's oven at 150° C. The properties of the vulcanizate were measured as in Example 1. The results are shown in Table 5.

The results show that the vulcanization systems in accordance with this invention give excellent compression set values even when the elastomer has a relatively small epoxy group content. It is also seen that in a comparison in which a vulcanization system composed of a dicarboxylic acid and a quaternary ammonium salt is used (Run No. 17) and a comparison in which ammonium benzoate alone is used as a vulcanization system (Run No. 18), the compression set becomes poor when the epoxy group content of the elastomer is small.

TABLE 5

| Test item | Run No. Invention | | | Comparison | |
|---|---|---|---|---|---|
| | 14 | 15 | 16 | 17 | 18 |
| Mooney scorch time (ML, 145° C.) | | | | | |
| Minimum viscosity | 47.0 | 43.0 | 42.5 | 43.0 | 48.0 |
| t5 (min.) | 3.7 | 4.0 | 4.5 | 4.1 | 4.2 |
| t35 (min.) | 6.9 | 10.5 | 8.2 | 8.0 | 6.9 |
| Properties after Press-curing at 170° C. for 20 min. | | | | | |

TABLE 5-continued

| Test item | Run No. Invention | | | Comparison | |
|---|---|---|---|---|---|
| | 14 | 15 | 16 | 17 | 18 |
| Tensile strength (kg/cm²) | 115 | 113 | 110 | 105 | 89 |
| Elongation (%) | 260 | 250 | 260 | 270 | 350 |
| 100% Tensile stress (kg/cm²) | 50 | 47 | 45 | 41 | 28 |
| Hardness (JIS) | 66 | 68 | 67 | 63 | 65 |
| Properties after post-curing at 150° C. for 4 hours | | | | | |
| Tensile strength (kg/cm²) | 129 | 129 | 127 | 122 | 114 |
| Elongation (%) | 220 | 210 | 220 | 220 | 270 |
| 100% Tensile stress (kg/cm²) | 63 | 60 | 59 | 57 | 44 |
| Hardness (JIS) | 70 | 71 | 70 | 70 | 69 |
| Properties after aging at 175° C. for 70 hours (vulcanizate obtained by press-curing at 170° C. × 20 min.) | | | | | |
| Tensile strength (kg/cm²) | 125 | 130 | 132 | 125 | 120 |
| Elongation (%) | 150 | 140 | 140 | 130 | 140 |
| Hardness (JIS) | 74 | 76 | 75 | 78 | 80 |
| Compression set (150° C. × 70 hrs, 25% compression) | | | | | |
| Vulcanizate obtained by press-curing at 170° C. × 20 min. (%) | 36 | 37 | 39 | 49 | 78 |
| Vulcanizate obtained by post-curing at 150° C. × 4 hrs. (%) | 25 | 20 | 28 | 35 | 60 |

TABLE 6-continued

| | Run No. | Vulcanizer Type | Amount (phr) |
|---|---|---|---|
| | 22 | isocyanuric acid/OTMeABr | 4/2 |
| Comparison | 23 | isocyanuric acid | 2 |
| | 24 | OTMeABr | 2 |
| Invention | 25 | isocyanuric acid/CeTMeAI | 2/1.5 |
| | 26 | isocyanuric acid/CePyBr | 2/1.5 |
| | 27 | isocyanuric acid/TBuPBr | 2/1.5 |
| | 28 | isocyanuric acid/TPhBPI | 2/1.5 |

Note:
Abbreviations used for the vulcanizers are as follows:
OTMeABr: octadecyltrimethyl ammonium bromide
CeTMeAI: cetyltrimethyl ammonium iodide
CePyBr: cetyl pyridium bromide
TBuPBr: tetrabutyl phosphonium bromide
TPhBPI: triphenylbenzyl phosphonium iodide The Mooney scorch time of the resulting composition was measured. The composition was press-cured at 170° C. for 20 minutes, and then post-cured for 4 hours in a Geer's oven at 150° C. The properties of the vulcanizate were measured as in Example 1. The results are shown in Table 7.

TABLE 7

| Test item | Run No. Invention | | | | Comparison | | Invention | | | |
|---|---|---|---|---|---|---|---|---|---|---|
| | 19 | 20 | 21 | 22 | 23 | 24 | 25 | 26 | 27 | 28 |
| Mooney scorch time (ML, 145° C.) | | | | | | | | | | |
| Minimum viscosity | 48.0 | 49.0 | 43.0 | 40.0 | Vulcanization was insufficient and practical vulcanizates could not be obtained. | | 43.5 | 45.0 | 45.0 | 42.0 |
| t5 (min.) | 4.6 | 2.2 | 3.2 | 6.8 | | | 3.7 | 3.7 | 3.5 | 5.7 |
| t35 (min.) | 14.4 | 2.9 | 6.4 | above 30 | | | 9.5 | 11.5 | 7.1 | 13.3 |
| Properties after press-curing at 170° C. for 20 minutes | | | | | | | | | | |
| Tensile strength (kg/cm²) | 103 | 119 | 118 | 92 | Vulcanization was insufficient and practical vulcanizates could not be obtained. | | 115 | 114 | 119 | 105 |
| Elongation (%) | 250 | 210 | 200 | 290 | | | 230 | 230 | 200 | 270 |
| 100% Tensile stress (kg/cm²) | 45 | 62 | 64 | 35 | | | 55 | 56 | 65 | 42 |
| Hardness (JIS) | 66 | 69 | 69 | 66 | | | 68 | 68 | 70 | 67 |
| Properties after post-curing at 150° C. for 4 hrs. | | | | | | | | | | |
| Tensile strength (kg/cm²) | 129 | 125 | 135 | 105 | Vulcanization was insufficient and practical vulcanizates could not be obtained. | | 129 | 127 | 128 | 119 |
| Elongation (%) | 200 | 180 | 180 | 220 | | | 200 | 190 | 190 | 200 |
| 100% Tensile stress (kg/cm²) | 63 | 78 | 85 | 60 | | | 63 | 68 | 69 | 65 |
| Hardness (JIS) | 71 | 71 | 72 | 69 | | | 72 | 71 | 74 | 70 |
| Properties after aging at 175° C. for 70 hrs. | | | | | | | | | | |
| Tensile strength (kg/cm²) | 128 | 120 | 132 | 120 | Vulcanization was insufficient and practical vulcanizates could not be obtained. | | 128 | 126 | 118 | 123 |
| Elongation (%) | 130 | 130 | 120 | 140 | | | 130 | 130 | 120 | 130 |
| Hardness (JIS) | 74 | 75 | 76 | 74 | | | 76 | 78 | 79 | 78 |
| Compression set (150° C. × 70 hrs, 25% compression) | | | | | | | | | | |
| Vulcanizate obtained by press-curing at 170° C. × 20 min. (%) | 43 | 42 | 36 | 58 | Vulcanization was insufficient and practical vulcanizates could not be obtained. | | 32 | 33 | 37 | 42 |
| Vulcanizate obtained by post-curing at 150° C. × 4 hrs. (%) | 15 | 26 | 22 | 35 | | | 18 | 22 | 27 | 20 |

EXAMPLE 3

In each run, 100 parts of the epoxy group-containing acrylate elastomer A (see Table 1), 1 part of stearic acid, 60 parts of MAF carbon black, 1 part of an amine-type antioxidant (NAUGARD 445, a product of Uniroyal Inc.) and a predetermined amount of each of the vulcanizers shown in Table 6 were kneaded by means of a 6-inch roll to prepare a composition.

TABLE 6

| | Run No. | Vulcanizer Type | Amount (phr) |
|---|---|---|---|
| Invention | 19 | isocyanuric acid/OTMeABr | 2/1 |
| | 20 | isocyanuric acid/OTMeABr | 2/4 |
| | 21 | isocyanuric acid/OTMeABr | 0.4/4 |

The results obtained show that the increase of the amount of the quaternary ammonium salt shortens the scorch time; the incorporation of an excess of the imidodicarbonyl group-containing compound retards the rate of vulcanization and thus impairs the various properties of the resulting vulcanizate; if either one of the quaternary ammonium salt and the imidodicarbonyl group-containing compound is lacking (Runs Nos. 23 and 24), the degree of vulcanization does not increase and the compositions are not suitable for practical applications; and that various quaternary ammonium salts and quaternary phosphonium salts can be used as vulcanizers in this invention.

EXAMPLE 4

In each run, 100 parts of en epoxy group-containing ethylene/acrylate copolymer elastomer [composition (% by weight) determined from the chemical shifts of $^{13}$C-NMR: ethylene 40, methyl acrylate 58.2, glycidyl methacrylate 1.8 (Mooney viscosity $ML_{1+4}$, 100° C., 18.0)], 1 part of stearic acid, 45 parts of MAF carbon black, 1 part of an amine-type antioxidant (NAUGARD 445, a product of Uniroyal Inc.) and a predetermined amount of each of the vulcanizers shown in Table 8 were kneaded by means of a 6-inch roller to prepare a composition.

TABLE 8

| Vulcanizer and its amount (phr) | Run No. | | | |
|---|---|---|---|---|
| | Invention | | | Comparison |
| | 29 | 30 | 31 | 32 |
| isocyanuric acid | 1.8 | — | 1.8 | — |
| 5,5-diethyl-barbituric acid | — | 2.5 | — | — |
| OTMeABr | 1.8 | 1.8 | — | — |
| CePyBr | — | — | 1.5 | — |
| ammonium benzoate | — | — | — | 1.3 |

The Mooney scorch time of the composition was measured. The composition was cured as in Example 1, and the properties of the vulcanizate were measured. The results are shown in Table 9.

TABLE 9

| Test item | Run No. | | | |
|---|---|---|---|---|
| | Invention | | | Comparison |
| | 29 | 30 | 31 | 32 |
| Mooney scorch time (ML, 145° C.) | | | | |
| Minimum viscosity | 27.0 | 27.5 | 27.5 | 28.5 |
| t5 (min.) | 4.7 | 4.8 | 4.8 | 4.1 |
| t35 (min.) | 12.5 | 7.3 | 10.5 | 7.3 |
| Properties after press-curing at 170° C. for 20 min. | | | | |
| Tensile strength (kg/cm$^2$) | 165 | 159 | 157 | 133 |
| Elongation (%) | 470 | 480 | 490 | 560 |
| 100% Tensile stress (kg/cm$^2$) | 35 | 34 | 32 | 28 |
| Hardness (JIS) | 68 | 67 | 67 | 63 |
| Properties after post-curing at 150° C. for 4 hours | | | | |
| Tensile strength (kg/cm$^2$) | 170 | 163 | 165 | 173 |
| Elongation (%) | 370 | 360 | 340 | 380 |
| 100% Tensile stress (kg/cm$^2$) | 43 | 44 | 47 | 47 |
| Hardness (JIS) | 70 | 69 | 69 | 71 |
| Properties after aging at 175° C. for 70 hours (vulcanizate obtained by press-curing at 170° C. × 20 min.) | | | | |
| Tensile strength (kg/cm$^2$) | 143 | 140 | 143 | 159 |
| Elongation (%) | 250 | 240 | 250 | 230 |
| Hardness (JIS) | 75 | 76 | 75 | 77 |
| Compression set (150° C. × 70 hrs, 25% compression) | | | | |
| Vulcanizate obtained by press-curing at 170° C. × 20 min. (%) | 36 | 38 | 39 | 77 |
| Vulcanizate obtained by post-curing at 150° C. × 4 hrs. (%) | 17 | 19 | 20 | 48 |

EXAMPLE 5

In each run, 100 parts of epoxy group-containing butadiene/acrylonitrile copolymer elastomer [composition (% by weight) determined by the chemical shifts of $^{13}$C-NMR: butadiene 65.2, acrylonitrile 33, glycidyl methacrylate 1.8 (Mooney viscosity $ML_{1+4}$, 100° C., 60)], 1 part of stearic acid, 40 parts of MAF carbon black and a predetermined amount of each of the vulcanizers shown in Table 10 were kneaded by means of a 6-inch roll to prepare a composition.

TABLE 10

| Vulcanizer and its amount (phr) | Run No. | | | |
|---|---|---|---|---|
| | Invention | | | Comparison |
| | 33 | 34 | 35 | 36 |
| isocyanuric acid | 1.8 | — | 1.8 | — |
| 5,5-diethyl-barbituric acid | — | 2.5 | — | — |
| OTMeABr | 1.6 | 1.6 | — | — |
| CePyBr | — | — | 1.4 | — |
| ammonium benzoate | — | — | — | 1.0 |

The composition was press-cured at 160° C. for 20 minutes, and the properties of the vulcanizates were measured in accordance with JIS K-6301. The results are shown in Table 11.

TABLE 11

| Test item | Run No. | | | |
|---|---|---|---|---|
| | Invention | | | Comparison |
| | 33 | 34 | 35 | 36 |
| Properties after press-curing at 160° C. for 20 minutes | | | | |
| Tensile strength (kg/cm$^2$) | 152 | 144 | 150 | 162 |
| Elongation (%) | 370 | 390 | 380 | 780 |
| 100% Tensile stress (kg/cm$^2$) | 44 | 43 | 45 | 19 |
| Hardness (JIS) | 70 | 70 | 70 | 64 |
| Compression set (%) (120° C. × 70 hrs, 25% compression) | 16 | 18 | 14 | 87 |

EXAMPLE 6

In each run, 100 parts of the acrylate elastomer A described in Example 1, 1 part of stearic acid, 60 parts of MAF carbon black (Seast 116, a product of Tokai Carbon Company), 1 part of an amine-type antioxidant (NAUGARD 445, a product of Uniroyal Inc.) and a predetermined amount of each of the vulcanizers shown in Table 12) were kneaded by means of a 6-inch roll a prepare a composition.

TABLE 12

| Vulcanizer and its Amount (phr) | Run No. | | | | | | | | | |
|---|---|---|---|---|---|---|---|---|---|---|
| | Invention | | | | | | | | Comparison | |
| | 37 | 38 | 39 | 40 | 41 | 42 | 43 | 44 | 45 | 46 |
| isocyanuric acid | 1.8 | 1.8 | 1.8 | 1.8 | 1.8 | 1.8 | 1.8 | 1.8 | — | — |
| eicosane-dioic acid | — | — | — | — | — | — | — | — | 1.6 | — |
| urea | 1.8 | — | — | — | — | — | — | — | — | — |
| phenylurea | — | — | — | — | — | — | — | — | — | — |
| N,N'-diphenylurea | — | — | 1.8 | — | — | — | — | — | — | — |
| N,N'-diethylurea | — | — | — | 1.8 | — | — | — | — | — | — |
| N,N'-dimethylolurea | — | — | — | — | 1.8 | — | — | — | — | — |
| N-acetonyl-N-phenylurea | — | — | — | — | — | 1.8 | — | — | — | — |
| ethyleneurea | — | — | — | — | — | — | 1.8 | — | — | — |
| OTMeABr | 1.8 | 1.8 | 1.8 | 1.8 | 1.8 | 1.8 | 1.8 | 1.8 | — | — |
| ammonium benzoate | — | — | — | — | — | — | — | — | — | 1.3 |

The Mooney scorch time of the resulting composition was measured in accordance with JIS K-6300. The composition was press-cured at 170° C. for 20 minutes, and the properties of the vulcanizate were measured in accordance with JIS K-6301. To evaluate the storage stability of the composition, the Mooney scorch time of the composition which had been left to stand at room temperature for 4 weeks was measured. The results are shown in Table 13.

The results obtained show that the vulcanization systems comprising the compound having at least two

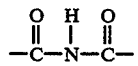

bonds in the molecule, the quaternary ammonium salt and urea (invention) give better scorch stability than the vulcanization system of Run No. 44 not containing the urea (comparison); and that the vulcanization systems in accordance with this invention show very good compression set values after press-curing at 170° C. for as short as 20 minutes. It can be seen from the results that post-curing can be omitted in this invention.

TABLE 13

| Test item | Run No. Invention | | | | | | | | Comparison | |
|---|---|---|---|---|---|---|---|---|---|---|
| | 37 | 38 | 39 | 40 | 41 | 42 | 43 | 44 | 45 | 46 |
| Mooney scorch time (ML, 145° C.) | | | | | | | | | | |
| Minimum viscosity | 42.0 | 41.5 | 41.0 | 42.0 | 41.5 | 41.0 | 42.0 | 45.0 | 45.0 | 51.0 |
| t5 (min.) | 4.7 | 5.0 | 5.7 | 4.7 | 4.8 | 5.5 | 4.8 | 3.4 | 3.7 | 3.3 |
| t35 (min.) | 8.5 | 9.2 | 9.8 | 8.6 | 8.8 | 9.5 | 8.8 | 10.3 | 7.9 | 5.4 |
| Mooney scorch time (ML, 145° C.) after standing at room temperature for 4 weeks | | | | | | | | | | |
| Minimum viscosity | 43.0 | 41.5 | 41.0 | 43.0 | 41.5 | 41.0 | 42.5 | 46.5 | 45.5 | 61.5 |
| t5 (min.) | 4.6 | 5.2 | 5.7 | 4.8 | 4.9 | 5.6 | 4.9 | 3.4 | 3.4 | 3.5 |
| t35 (min.) | 8.4 | 9.4 | 9.9 | 8.9 | 9.0 | 9.7 | 8.8 | 10.8 | 7.2 | 5.8 |
| Properties after press-curing at 170° C. for 20 minutes | | | | | | | | | | |
| Tensile strength (kg/cm$^2$) | 113 | 116 | 109 | 110 | 113 | 110 | 110 | 114 | 113 | 108 |
| Elongation (%) | 220 | 230 | 220 | 230 | 200 | 220 | 220 | 220 | 230 | 270 |
| 100% Tensile stress (kg/cm$^2$) | 57 | 52 | 56 | 50 | 62 | 54 | 51 | 58 | 53 | 45 |
| Hardness (JIS) | 67 | 68 | 69 | 68 | 67 | 69 | 68 | 68 | 70 | 65 |
| Properties after aging at 175° C. for 70 hours (vulcanizate obtained by press-curing at 170° C. × 20 min.) | | | | | | | | | | |
| Tensile strength (kg/cm$^2$) | 125 | 127 | 128 | 125 | 123 | 129 | 123 | 131 | 127 | 140 |
| Elongation (%) | 130 | 130 | 130 | 120 | 120 | 130 | 120 | 130 | 120 | 120 |
| Hardness (JIS) | 79 | 78 | 78 | 79 | 79 | 77 | 79 | 78 | 79 | 79 |
| Compression set (150° C. × 70 hrs, 25% compression) | | | | | | | | | | |
| Vulcanizate obtained by press-curing at 170° C. × 20 min. (%) | 30 | 28 | 23 | 27 | 30 | 25 | 28 | 34 | 36 | 70 |

EXAMPLE 7

In each run, a composition was prepared by using the same acrylate elastomer and compounding recipe as in Example 4 except that each of the vulcanizers shown in Table 14 was used in the amount indicated.

TABLE 14

| Vulcanizer and its amount (phr) | Run No. Invention | | | Comparison |
|---|---|---|---|---|
| | 47 | 48 | 49 | 50 |
| isocyanuric acid | 1.8 | — | 1.8 | — |
| barbital | — | 2.5 | — | 2.5 |
| OTMeABr | 1.8 | 1.8 | — | — |
| N,N'-diphenylurea | 1.5 | 1.5 | 1.8 | 1.8 |

The Mooney scorch time of the composition was measured. The composition was cured, and the properties of the vulcanizate were measured, as in Example 1. The results are shown in Table 15.

TABLE 15

| Test item | Run No. Invention | | | Comparison |
|---|---|---|---|---|
| | 47 | 48 | 49 | 50 |
| Mooney scorch time (ML, 145° C.) | | | | |
| Minimum viscosity | 26.5 | 26.0 | 27.0 | 27.5 |
| t5 (min.) | 6.2 | 6.3 | 4.7 | 4.8 |
| t35 (min.) | 10.4 | 10.7 | 12.5 | 7.3 |
| Properties after press-curing at 170° C. for 20 minutes | | | | |
| Tensile strength (kg/cm$^2$) | 163 | 158 | 165 | 159 |
| Elongation (%) | 450 | 470 | 470 | 480 |
| 100% Tensile stress (kg/cm$^2$) | 34 | 33 | 35 | 34 |
| Hardness (JIS) | 67 | 67 | 68 | 67 |
| Properties after heat aging at 175° C. for 70 hours | | | | |
| Tensile strength (kg/cm$^2$) | 141 | 139 | 143 | 140 |
| Elongation (%) | 260 | 250 | 250 | 240 |
| Hardness (JIS) | 76 | 79 | 75 | 76 |
| Compression set (150° C. × 70 hours, 25% compression) | | | | |
| Vulcanizate formed by press-curing at 170° C. for 20 hrs. (%) | 27 | 29 | 36 | 38 |

EXAMPLE 8

In each run, a composition was prepared by using the elastomer and compounding recipe shown in Example 5 except that each of the vulcanizers indicated in Table 16 was used in the amount indicated.

The composition was press-cured at 160° C. for 20 minutes, and the properties of the vulcanizate were measured in accordance with JIS K-6301. The results are also shown in Table 16.

TABLE 16

| Vulcanizer and its amount (phr) | Run No. Invention | | | | Comparison |
|---|---|---|---|---|---|
| | 51 | 52 | 53 | 54 | 55 |
| isocyanuric acid | 1.8 | — | 1.8 | — | — |
| barbital | — | 2.5 | — | 2.5 | — |
| OTMeABr | 1.6 | 1.6 | 1.5 | 1.5 | — |
| N,N'-diphenylurea | 1.5 | 1.5 | — | — | — |
| ammonium benzoate | — | — | — | — | 1.0 |
| Properties after press-curing at 160° C. for 20 minutes | | | | | |
| Tensile strength (kg/cm$^2$) | 150 | 147 | 151 | 144 | 162 |
| Elongation (%) | 380 | 400 | 370 | 390 | 780 |

TABLE 16-continued

| Vulcanizer and its amount (phr) | Run No. | | | | |
|---|---|---|---|---|---|
| | Invention | | | | Comparison |
| | 51 | 52 | 53 | 54 | 55 |
| 100% Tensile stress (kg/cm²) | 43 | 42 | 44 | 43 | 19 |
| Hardness (JIS) | 70 | 70 | 70 | 70 | 64 |
| Compression set (120° C. × 70 hrs; 25% compression) (%) | 10 | 12 | 16 | 18 | 87 |

What is claimed is:

1. A vulcanizable elastomer composition exhibiting scorch stability, storage stability, rapid vulcanizability, compression set resistance and heat aging resistance comprising an epoxy group-containing elastomer having said epoxy groups as cross-linking sites, and blended therewith a vulcanization system for cross-linking said epoxy group-containing elastomer through said epoxy groups, said vulcanization system consisting essentially of (1) an organic compound having at least two bonds of the following formula

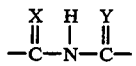

wherein X and Y are both oxygen or sulfur atoms, or one of X and Y is an oxygen atom and the other is a sulfur atom in the molecule, and (2) a quaternary compound selected from quaternary ammonium salts and quaternary phosphonium salts.

2. A vulcanizable elastomer composition exhibiting scorch stability, storage stability, rapid vulcanizability, compression set resistance and heat aging resistance comprising an epoxy group-containing elastomer having said epoxy groups as cross-linking sites, and blended therewith a vulcanization system for cross-linking said epoxy group-containing elastomer through said epoxy groups, said vulcanization system consisting essentially of (1) an organic compound having at least two bonds of the following formula

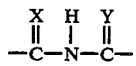

wherein X and Y are both oxygen or sulfur atoms, or one of X and Y is an oxygen atom and the other is a sulfur atom, in the molecule, and (2) a quaternary compound selected from quaternary ammonium salts and quaternary phosphonium salts, and (3) a compound having one

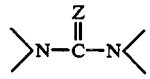

bond wherein Z represents an oxygen or sulfur atom in the molecule.

3. The composition of claim 1 comprising 0.1 to 10 parts by weight of the organic compound and 0.1 to 10 parts by weight of the quaternary compound (2) per 100 parts by weight of the epoxy group-containing elastomer.

4. The composition of claim 2 comprising 0.1 to 10 parts by weight of the organic compound (1), 0.1 to 10 parts by weight of the quaternary compound (2) and 0.1 to 10 parts by weight of the compound (3) per 100 parts by weight of the epoxy group-containing elastomer.

5. The composition of claim 1 or 2 wherein the organic compound (1) is selected from heterocyclic compounds, aromatic compounds and aliphatic compounds each containing at least two said bonds in the molecule.

6. The composition of claim 1 or 2 wherein the quaternary compound (2) is a compound represented by the formula

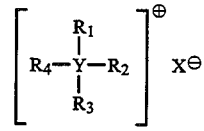

wherein Y is a nitrogen or phosphorus atom, each of $R_1$, $R_2$, $R_3$ and $R_4$ represents a hydrocarbon group, and two or three of these groups $R_1$ to $R_4$ may form together with Y a heterocyclic ring in which at least two ring atoms are carbon atoms and the remainder are oxygen, nitrogen, phosphorus or sulfur atoms, and X is an anion.

7. The composition of claim 1 or 2 wherein the compound (3) is selected from the group consisting of aliphatic urea compounds, aliphatic thiourea compounds, aromatic urea compounds, aromatic thiourea compounds, heterocyclic urea compounds and heterocyclic thiourea compounds each containing one said bond.

* * * * *